HIGH DEFINITION MAGNETIC TAPE RECORDER FOR VIDEO SIGNALS

Filed Dec. 27, 1966 2 Sheets-Sheet 1

INVENTORS.
YASUAKI WATANABE
TADAYASU OHTSU
MASAHIKO NAGANO
YOZO AOKI

BY [signature]
ATTORNEY

INVENTORS
YASUAKI WATANABE
TADAYASU OHTSU
MASAHIKO NAGANO
YOZO AOKI
BY
ATTORNEY

United States Patent Office 3,535,440

Patented Oct. 20, 1970

3,535,440

HIGH DEFINITION MAGNETIC TAPE RECORDER FOR VIDEO SIGNALS

Yasuaki Watanabe, Chigasaki, Tadayasu Ohtsu, Yokohama, Masahiko Nagano, Tokyo, and Yozo Aoki, Yokohama, Japan, assignors to Victor Company of Japan, Limited, Yokohama, Japan Filed Dec. 27, 1966, Ser. No. 604,868
Claims priority, application Japan, Dec. 30, 1965, 41/81,777; Jan. 22, 1966, 41/3,622
Int. Cl. H04n 5/78; G11b 5/00
U.S. Cl. 178—6.6 11 Claims

ABSTRACT OF THE DISCLOSURE

Multiple head, helical scan, video, magnetic tape recorders use rotary head driving systems which rotate at a much higher speed than in the conventional systems. Each video signal field is usually recorded on one recording track. According to the invention, each field is recorded on more than one track, typically 2½ or 3 tracks. Because each field is recorded on an effectively longer track, the speed at which the transducing heads pass the tape can be increased to improve the upper frequency response of the system. This is a compatible system for recording color and monochromatic video signals. Also, the system reduces image distortion caused by differences in the transducing characteristics of the recording and reproducing heads.

This invention relates to a system for recording and reproducing a video signal and more particularly to a helical scan-type vido magnetic tape recording and reproducing system comprising a pair of magnetic heads alternately energized to record and reproduce a video signal in diagonal tracks on a magnetic tape or a similar information storage medium.

For a given transducer head and recording medium, the maximum signal frequency which can be recorded or reproduced by a video tape recorder is a function of the speed, V, at which the recording medium passes the transducer head. This frequency is described by the equation $$f=\frac{V}{\lambda}$$

wherein $\lambda$ is the wave length of the highest frequency signal which can be transduced by the head.

Generally, in helical scan-type recording systems, the tape speed is much less than the rotating speed of the magnetic heads. Thus, a first approximation of the relative speed between the tape and the heads is about equal to the speed of the rotary magnetic heads alone.

There are two methods to obtain a high or relative speed V in order to increase the frequency response of helical scan-type tape recorders. In the first method the diameter of the drum holding the heads is increased. In the other method, the speed of the drum is increased.

The prior art systems using two transducing heads limit the speed of the rotary magnetic head to thirty revolutions per second for recording one field of the video signal in one track. There is no way to increase the frequency range of such as system except by enlarging the diameter of the rotary drum containing the heads. However, if the diameter of the rotary drum is enlarged, the slope of the track on the magnetic tape decreases, and the tracks tend to become oriented in the longitudinal direction of the tape. When this occurs, the fidelity of the signals may be affected by the expansion and contraction of the magnetic tape, changes in tape speed, and tracking irregularities. Normally, these factors are insignificant in systems having moderate track slopes.

Further, in a system wherein each field is divided and recorded and reproduced by a plurality of magnetic heads, distorted images may be reproduced because each head has a different transducing characteristic.

Accordingly, a principal object of this invention is to provide a monochromatic and color signal compatible system for magnetically recording and reproducing a video signal with better quality and less distortion than can be attained with the prior act recorders.

Further, objects will become apparent from the following description taken in conjunction with the accompanying drawings, in which:

FIGS. 5A–5G are oscillograms appearing at selected nodes of the drive motor control means shown in FIG. 4;

Figure 1:
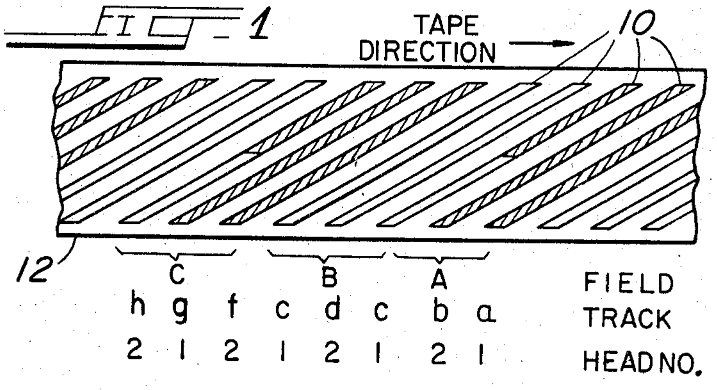
FIG. 1 is a schematic view showing a track pattern recorded on a magnetic tape by one embodiment of a system according to this invention.

FIG. 1 illustrates one embodiment of a pattern of tracks 10 recorded on a magnetic tape 12 by a two head helical scan-type video magnetic tape recorder. In this embodiment, one field of a standard television video signal is recorded in two and one-half tracks. In FIG. 1 shaded portions of the tracks indicate the locations of the recordings of the odd-numbered fields, and the unshaded track portions indicate the locations of the recordings of the even-numbered fields. The tracks are alternately recorded by the first and second transducing heads successively.

By recording one field in 2½ tracks, instead of one track, a composite track which is substantially 2½ times as long as a conventional track, is obtained. Because the recording time per field is constant, the recording speed V for the system of the invention is 2½ greater than the conventional speed. As a result, a signal having a frequency higher than that in the conventional system can be recorded and reproduced.

Figure 2:
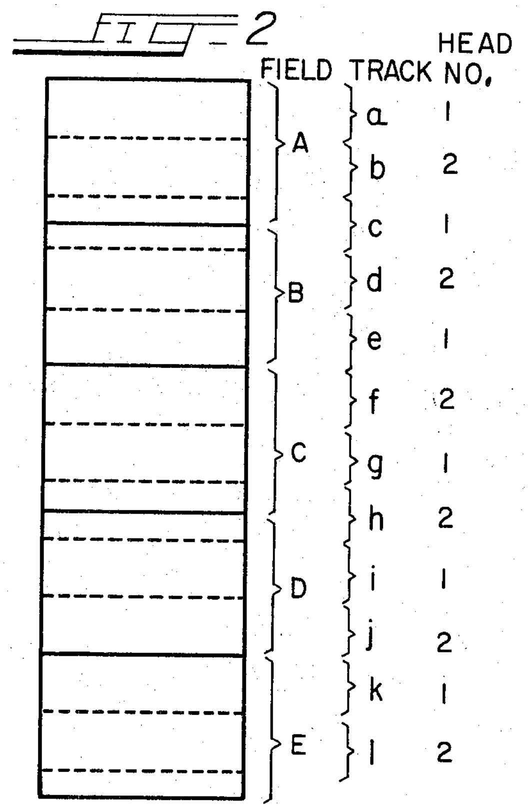
FIG. 2 is a schematic view of the magnetic head change-over portions on a reproduced picture in one embodiment of invention.

In the first embodiment of a recording system of this invention, the magnetic heads used to record and reproduce the picture are changed five times for each two fields. As shown in FIG. 1 and 2, an upper two-fifths portion of the first field A is constructed by the signal on track *a* reproduced by magnetic head No. 1. A second two-fifths portion is constructed by the signal on track *b* reproduced by magnetic head No. 2. A lower one-fifth portion of the first field A and an upper one-fifth portion of the next field B are constructed by the signal on track *c* reproduced by the first magnetic head No. 1. Sequential fields C, D and E are also reproduced by the magnetic heads as described above.

A magnetic head change-over pattern similar to that in the first field A appears at every fifth field, counting from the first field A. This may be seen if one makes a simple table which plots the head scanning sequence for five successive fields. Each successive field may be represented by a letter in alphabetical order. Numbers identifying the scanning heads represent five equal portions of each individual field. By way of example, the statement in the preceding paragraph may be written "A, 1, 1, 2, 2, 1" which means that head No. 1 scans the first two-fifths of a picture field; head No. 2 scans the second two-fifths of the same field; head No. 1 scans the last one-fifth of this field. By this notation, the scanning sequence is: A, 1, 1, 2, 2, 1, B, 1, 2, 2, 1, 1, C, 2, 2, 1, 1, 2, D, 2, 1, 1, 2, 2, E, 1, 1, 2, 2, 1, F, 1, 2, . . . It should be noted that the pattern in field A is not repeated until five fields later in field E.

Figures 3, 5:
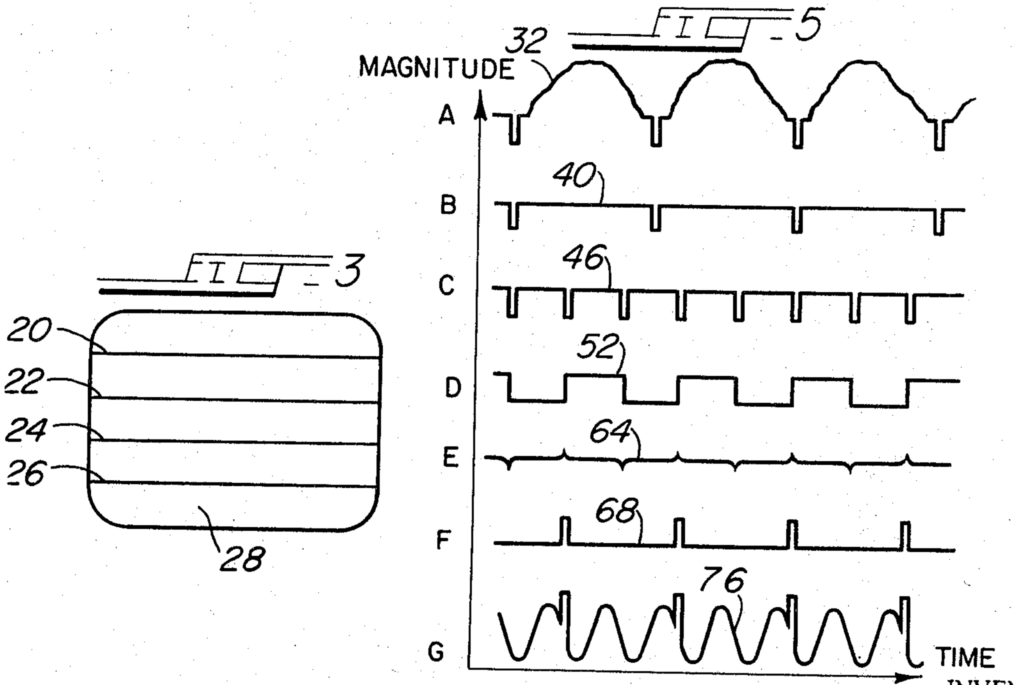
FIG. 3 is another schematic view of magnetic head change-over portions on a reproduced picture in one embodiment of the invention.

Thus, even if the two rotary magnetic heads have different transducing characteristics, the reproduced image is not visually distorted by the difference in head characteristics and the picture remains visually stable. In this system the magnetic heads are changed over at four portions 20, 22, 24 and 26 in a video picture 28 as shown in FIG. 3

In order to record and reproduce one field of the standard television video signal in 2½ tracks, the speed of the rotary magnetic heads must be increased to become 75 revolutions per second, which is 2½ times greater than in the conventional system.

In this embodiment, a normal four-pole synchronous motor is used as a driving motor for the rotary magnetic heads. To obtain a speed of 75 revolutions per second, the motor driving frequency must be 150 Hz.

To obtain stable operation, the 150 Hz. signal is generated by multiplying a 60 Hz. synchronizing signal by 2½ as will be described below.

Figure 4:
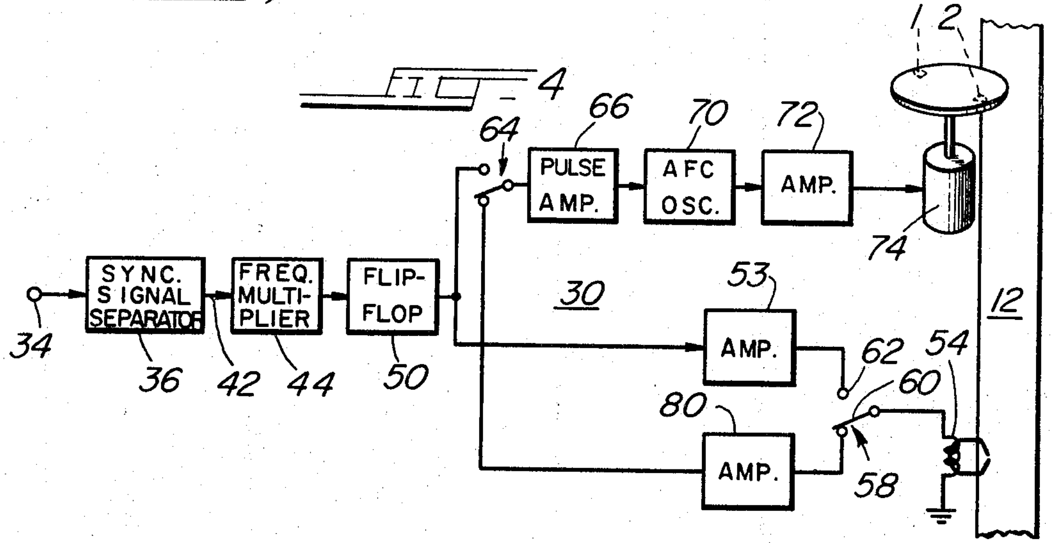
FIG. 4 is a block diagram of the drive motor control means for driving the rotary magnetic heads in one embodiment of a system of this invention.

FIGS. 4 and 5 illustrate an embodiment of the drive motor control system 30 for driving the rotary magnetic heads 1 and 2. This system is similar to that described in our copending application Ser. No. 590,016, filed Oct. 27, 1966. In order to record a video signal 32, as shown in the oscillogram of FIG. 5A, it is applied to a terminal 34. This is the input terminal of a vertical sync signal separator circuit 36.

The separated sync signals 40, as shown in the oscillogram of FIG. 5B, appear at the output 42 of the separator circuit 36. The sync signals 40 are applied to the input of a frequency multiplier 44 which generates a 150 Hz. output pulse signal 46 having 2½ times as many pulses as the input signal, the input and output pulses being synchronized as shown in FIG. 5C.

The 150 Hz. pulses trigger a flip-flop circuit 50 which generates a 75 Hz. square wave 52 as shown in FIG. 5D. During recording, the square wave 52 is transmitted through a recording amplifier 53 to a control signal magnetic transducing head 54 for recording in a control track provided on the upper margin of the magnetic tape 12. The control signal is passed through a SPDT switch 58 operated so that its pole 60 engages its contact 62. Because of the distributed reactance of the recording circuit, the square wave 52 is distorted so that the signal actually recorded on the tape 12 by the head 54 has an oscillogram 64 as shown in FIG. 5E.

The output signal 52 of the fip-flop circuit 50 also is transmitted through a SPDT switch 64 to a pulse amplifier 66 which selectively amplifies the pulses of only one polarity as shown in FIG. 5F. The amplfied pulses 68 are then introduced into an AFC oscillator circuit 70 which generates a sinusoidal-like signal at 150 Hz.

The AFC oscillator circuit 70 operates as a locked oscillator during recording periods. Its output is amplified by amplifier 72 and transmitted to motor 74 which rotates the magnetic heads 1 and 2. An oscillogram of the oscillator's amplified output signal 76 is shown in FIG. 5G.

When an image is to be reproduced, the control signal recorded along the margin of the tape is detected by the magnetic transducing head 54. The pulses of one polarity, which are the same as those amplified by the amplifier 66, are amplified by a control signal amplifier 80 when the switch 58 is toggled to the position shown in FIG. 4. The reproduced pulses are transmitted to the AFC oscillator circuit 70 when the switch 64 is toggled to the position shown in FIG. 4. Thus the output signal 76 of the AFC oscillator circuit 70 is synchronized with the 150 Hz. signal recorded on the margin of the tape 12 by the magnetic transducing head 54.

The rotary magnetic heads 1 and 2 scan the tracks on the recorded magnetic tape 12 in perfect register with the previously recorded tracks so that high quality images are produced.

In this embodiment, the speed of the rotary magnetic heads is 75 revolutions per second. Thus, a color video signal, in a sequential field system having a field frequency of 150 Hz. can be recorded and reproduced using the same means for rotating the magnetic heads that is used for recording monochromatic signals. It is noted, however, that when color signals are recorded, each field is recorded on a single track rather than on 2½ tracks as is the case with monochromatic signals.

Another embodiment of this invention will be described in conjunction with FIGS. 6 and 7.

Figure 6:
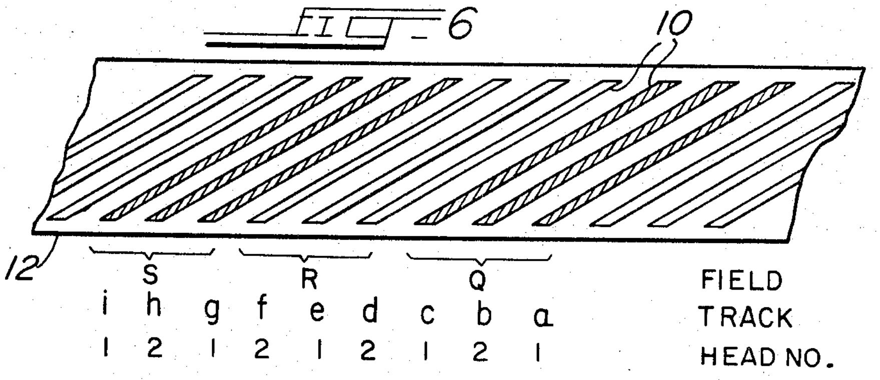
FIG. 6 is a schematic view of another track pattern recorded on magnetic tape by another embodiment of a system of this invention.
Figure 7:
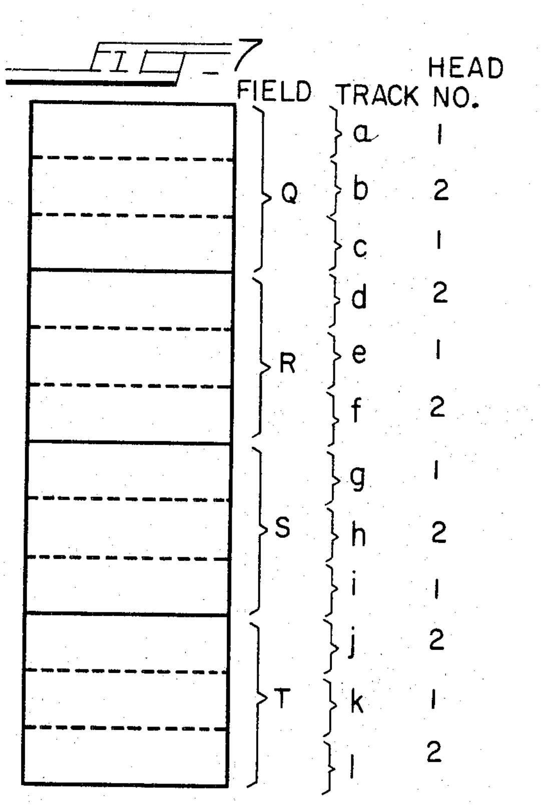
FIG. 7 is a schematic view of the magnetic head change-over portions on a picture reproduced by a second embodiment of the system shown in FIG. 6.

FIG. 6 is an illustration of a track pattern recorded on a magnetic tape 12 wherein one field of a standard video signal is recorded on three tracks. The shaded tracks are those containing the recordings of the odd-numbered fields.

When each of the fields is recorded and reproduced on three tracks as described, each sequential portion of the picture is recorded and reproduced by a different head in alternate sequence. Thus in reference to FIGS. 6 and 7, the upper one-third portion of the first field Q is reconstructed from the signals recorded on track *a* by the magnetic head 1. The central portion thereof is reproduced from the signals on track *b* by the magnetic head 2. The lower portion thereof is reproduced by the signals on track *c* by the magnetic head 1. Sequential fields R, S and T are also reproduced by each of the magnetic heads 1 and 2 in the alternate sequential manner described above.

As stated previously, the operating order of the rotary magnetic heads 1 and 2 is changed so that if the two rotary magnetic heads have different transducing characteristics, the reproduced pictures are not distorted by the difference and the reproduced pictures remain stable visually.

Having described preferred embodiments of the invention, it is recognized that alternative structures may be devised which remain within the scope of the invention as defined in the following claims. By way of example, the frequencies of the various signals in the drive motor control system 30 may be changed to facilitate the use of optimal components or motors having more than four poles. Thus, it is possible to have the frequency multiplier 44 multiply the separated sync signals 40 by some amount other than 2½; for instance, by some whole number, or integer, times the number of tracks per frame.

What is claimed is:

1. A system for magnetically recording and reproducing a video signal divided into a periodic sequence of fields on a magnetic tape, in which said sequence of fields is recorded and reproduced in a plurality of tracks, comprising:

(a) two magnetic transducing heads equally spaced around the periphery of a drum journaled for rotation about a point located midway between the recording heads;

(b) means for drawing the magnetic tape past the transducing heads and the drum so that the longitudinal axis of the magnetic tape is diagonal to the direction of the rotation of the magnetic transducing heads;

(c) means for causing different heads to record or reproduce the same tracks of each successive field, said means comprising means for rotating the drum and the magnetic transducing heads at a rotary speed wherein each field extends over a number of tracks which causes said heads to switch an odd number of times during the recording or reproducing of each said fields; and (d) means for rotating the drum and the magnetic transducing heads at a rotary speed equal to $$\frac{a \cdot f}{2}$$

where $f$=field frequencies of the monochromatic video signal, and $a$=the number of tracks upon which each monochromatic signal field is recorded, the number of tracks being greater than one.

2. The system of claim 1 for recording video signals having 60 fields per second wherein:

each field is recorded on 2½ tracks and the drum and the recording heads are rotated at 75 revolutions per second.

3. The system of claim 1 wherein:

$a=3$.

4. The system of claim 1 wherein:

$a=0.5+2+n$ where $n$=any integer equal to or greater than zero.

5. The system of claim 1 for use in recording compatible color and monochromatic video signals wherein:

the number of tracks equals the ratio of the number of fields in a color video signal to the number of fields in a compatible monochromatic video signal per unit of time.

6. The system of claim 5 wherein:

$a=2.5$.

7. The system of claim 1 wherein the means for rotating the drum and the magnetic transducing heads comprise:

(a) means for separating the synchronizing signal from the video signal;

(b) a synchronous motor for rotating the heads and the drum;

(c) means for multiplying the separated synchronizing signal in frequency to obtain a driving signal having a frequency equal to $$\frac{a \cdot p}{2}$$

where:

$p$=the number of magnetic poles in the synchronous motor;

(d) means for energizing the motor with the driving signal and for recording a signal phase-locked to the driving signal onto the magnetic tape during periods when a video signal is being recorded; and (e) means for driving the motor with a driving signal synchronized to the phase-locked signal recorded on the magnetic tape when a video signal is to be reproduced.

8. The system of claim 7 wherein:

the driving signal resembles a sinusoidal function of time.

9. The system of claim 8 wherein the means for energizing the motor comprise:

an automatic frequency control sinusoidal-like waveform oscillator regulated by pulsed synchronizing signals.

10. A system for magnetically recording and reproducing monochromatic and color video signals divided into a periodic sequence of fields onto a series of diagonal tracks on magnetic tape, comprising:

(a) a pair of magnetic transducing heads equally spaced around the periphery of a drum journaled for rotation about a point located midway between the recording heads;

(b) means for drawing the magnetic tape past the transducing heads and the drum; and (c) means for rotating the drum and the magnetic transducing heads at 75 revolutions per second incorporating (1) means for separating a synchronizing signal from the video signal;

(2) means for multiplying the separated synchronizing signal in frequency to obtain a 150 Hz. driving signal;

(3) a four-pole synchronous motor for rotating the heads and the drum;

(4) means for energizing the motor with the driving signal and for recording a signal phase-locked to the driving signal onto the magnetic tape during periods when a video signal is being recorded; and (5) means for driving the motor with a driving signal synchronized to the phase-locked signal recorded on the magnetic tape when a video signal is being reproduced.

11. A system for magnetically recording and reproducing on magnetic tape a video signal divided into a periodic sequence of fields, in which said periodic sequence of fields is recorded and reproduced in a plurality of tracks, said system comprising:

(a) two magnetic tranducing heads equally spaced around the periphery of a drum journaled for rotation about a point located midway between the recording heads;

(b) means for drawing the magnetic tape past the transducing heads and the drum so that the longitudinal axis of the magnetic tape is diagonal to the direction of the rotation of the magnetic transducing heads; and (c) means for causing different heads to record or reproduce the same tracks during successive fields, said means comprising means for rotating the drum and the magnetic transducing heads at a rotary speed wherein each field extends over a number of tracks which causes said heads to switch an odd number of times during the recording or reproducing of each field of video signals.

References Cited

UNITED STATES PATENTS

| | | |
|---|---|---|
| 2,965,708 | 12/1960 | Witt. |
| 3,037,073 | 5/1962 | Roifen et al. |
| 3,071,644 | 1/1963 | Olive. |
| 3,385,926 | 5/1968 | Tanaka et al. |

ROBERT L. GRIFFIN, Primary Examiner

D. E. STOUT, Assistant Examiner

U.S. Cl. X.R.

179—100.2